United States Patent

[11] 3,593,282

[72] Inventor Shih Y. Tong, Middletown, N.J.
[21] Appl. No. 873,796
[22] Filed Nov. 4, 1969
[45] Patented July 13, 1971
[73] Assignee Bell Telephone Laboratories, Incorporated, Murray Hill, Berkeley Heights, N.J.

[54] CHARACTER-ERROR AND BURST-ERROR CORRECTING SYSTEMS UTILIZING SELF-ORTHOGONAL CONVOLUTION CODES

9 Claims, 7 Drawing Figs.

[52] U.S. Cl. .......... 340/146.1
[51] Int. Cl. .......... G06f 11/12, G08c 25/00
[50] Field of Search .......... 340/146.1, 172.5; 235/153

[56] References Cited

UNITED STATES PATENTS

| | | | |
|---|---|---|---|
| 3,303,333 | 2/1967 | Massey | 340/146.1 X |
| 3,402,393 | 9/1968 | Massey | 340/146.1 X |
| 3,469,236 | 9/1969 | Gallager | 340/146.1 |
| 3,475,724 | 10/1969 | Townsend et al. | 340/146.1 |

*Primary Examiner*—Malcolm A. Morrison
*Assistant Examiner*—Charles E. Atkinson
*Attorneys*—R. J. Guenther and Kenneth B. Hamlin

ABSTRACT: Systems are disclosed for utilizing self-orthogonal convolution codes for correcting $t$ character errors and certain burst errors. The elements or characters of the code words of the particular code utilized are elements of a finite field GF($p^l$). Information characters are encoded into the code and transmitted along with parity characters to a receiving terminal where they are there decoded to obtain the syndrome thereof. The number of nonzero elements in a portion $\{S_0, S_1, \ldots, S_{2t-1}\}$ of the syndrome is then counted and if this number exceeds a threshold value $t$, it is assumed that errors have occurred in the block of characters being checked. The simultaneous equations $S_i = \alpha^{r_1 i} e_1 + \ldots + \alpha^{r_{t'} i} e_{t'}$ are then solved for $r_1, \ldots, r_{t'}$, and for $e_1, \ldots, e_{t'}$, where $t'$ is the number of errors in the block ranging from 1 to $t$, $i = 0, \ldots, 2t-1$, and $\alpha$ is the primitive root of GF($p^l$). The number of errors $t'$ is determined as that $t'$ which satisfies $t+1$ or more of the equations $S_i$. The values of $r$ obtained from solving these equations identify the error positions in the received block of characters and each $e_i$ gives the value of the error in the corresponding error position $r_i$. Each $e_i$ is then added to the character in position $r_i$ to thereby correct the erroneous characters.

INVENTOR
S. Y. TONG
BY
ATTORNEY

CHARACTER-ERROR AND BURST-ERROR CORRECTING SYSTEMS UTILIZING SELF-ORTHOGONAL CONVOLUTION CODES

Background of the Invention

1. Field of the Invention

This invention relates to data processing systems and more particularly to error detection and correction in such systems.

2. Description of the Prior Art

The need for controlling and limiting digital errors in the transmission and processing of digital data has long been recognized. Normally, such digital data is represented by sequences of binary signals (referred to as bits), wherein each sequence (or data character) comprises a fixed number of bits. Information messages are then represented by different combinations of data characters just as combinations of symbols of the alphabet represent words.

Most error control methods provide for the correction of single or multiple bit errors in the data character. Such methods include encoding the data characters into code words, for example, by appending one or more parity bits to the data characters to be processed. Following processing, each encoded data character is decoded to determine if bit errors have occurred in the character. With such methods, of course, each individual data character must be treated separately. Since most data processing systems are character-oriented, it would appear desirable to provide an error-correcting arrangement for correcting not simply bit errors but rather character errors.

SUMMARY OF THE INVENTION

In view of the above-described prior art arrangements, it is an object of this invention to provide a multiple character error-correcting system for correcting all bit errors in a plurality of characters.

It is another object of the present invention to provide a character error-correcting system wherein a plurality of data characters can be processed simultaneously for the detection and correction of character errors.

It is still another object of the present invention to provide systems for correcting both multiple character errors and certain burst errors.

Finally, it is an object of the present invention to provide for multiple character error and burst-error correction in an efficient and economical fashion.

These and other objects of the present invention are realized in a specific illustrative system embodiment in which information characters are encoded in a $t$ character error-correcting self-orthogonal convolution code—the characters of which constitute elements of a finite field $GF(p^1)$. The encoded characters are transmitted to a receiving terminal where they are there decoded to obtain the syndrome thereof. The number of nonzero elements in a portion $\{S_0, S_1, ..., S_{2t-1}\}$ of the syndrome is then counted and if this number exceeds a threshold value $t$, it is assumed that errors have occurred in the block of characters being checked. If errors are detected, then the simultaneous equations $S_i = \alpha^{r_1 i} e_1 + ... + \alpha^{r_{t'} i} e_{t'}$ are solved for $r_1, ..., r_{t'}$, and $e_1, ..., e_{t'}$, where $t'$ is the number of errors in the block ranging from 1 to $t$, $i=0, ..., 2t-1$, and $\alpha$ is the primitive root of $GF(p^1)$. The number of errors $t'$ is determined as that $t'$ which satisfies $t+1$ or more of the equations $S_i$. The values of $r$ so obtained from solving these equations identify the error positions in the block of characters in question and each $e_i$ gives the value of the error in the corresponding error position $r_i$. Each $e_i$ is then added to the character in the position $r_i$ to thereby correct the erroneous characters.

Brief Description of the Drawings

A complete understanding of the present invention and of the above and other objects and advantages thereof may be gained from a consideration of the following detailed description of an illustrative embodiment thereof presented hereinbelow in connection with the accompanying drawings, in which.

Detailed Description

Figure 1:
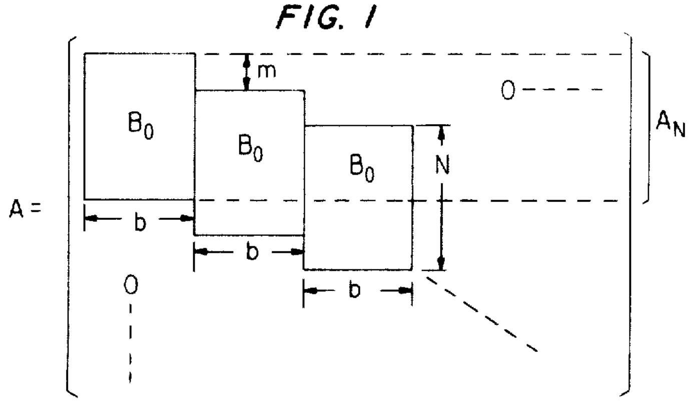
FIG. 1 shows a generalized parity check matrix for convolution codes.

Before discussing the apparatus shown in the drawings, a general description of convolution codes will be given. A convolution or recurrent code may be defined as a set of digital sequences which satisfy a set of parity check equations where the parity check matrix is of the form shown in FIG. 1. (In this connection, see Wyner, A. D. and Ash, R. B. "Analysis of Recurrent Codes," *I.E.E.E. Transactions on Information Theory*, July 1962, pages 143—150.) The blocks $B_0$ of FIG. 1 represent semiinfinite matrices, each with $b$ columns, an infinite number of rows, and a finite number of nonzero entries. All entries of the $A$ matrix other than the $B_0$ blocks are zeros. The parameter $b$ is determined as the smallest integer such that an $N$ by $b$ matrix $B_0$ can generate the matrix $A$. Also, $b$ is the basic "block" length of the code, i.e., $b$ defines the number of characters in a code "block". $A_N$ is a matrix comprised of the first N rows of the matrix $A$ and is sufficient to reconstruct the matrix $A$. The code words of a convolution code may now be defined as semiinfinite sequences $X$ which satisfy the equation $A \cdot X=0$.

Let $x_i$ represent the $i^{th}$ entry or character of the code work $X$. The first $m$ rows of matrix $A$ may be thought of as $m$ equations in the $b$ unknowns $x_1, ..., x_b$. Assuming that the first $m$ rows of matrix $A$ are linearly independent, $b-m$ of the first $b$ characters of $X$ may be chosen arbitrarily. Once $x_1, ..., x_b$ have been chosen to satisfy the first $m$ equations, the next $m$ rows of matrix $A$ may be utilized as $m$ equations in the $b$ unknowns $x_{b+1}, ..., x_{2b}$. The procedure may be repeated for each block of $b$ characters; $b-m$ characters in each block may be chosen arbitrarily and the remaining $m$ characters are determinable from the $m$ equations (referred to hereafter as parity check equations). Thus there are $m$ check characters for every $b$ characters of $X$ giving a redundancy of $m/b$ or a rate of $(b-m)/b$ (i.e., $b-m$ information characters for every $m$ parity check characters giving a "block" length of $b$ as stated before). The constraint length of this code is $n=(b/m)N$; it is assumed that $m$ divides $N$ evenly.

The characters of the code words of the above-defined code are elements of a finite field $GF(p^1)$ where $p$ is the alphabet size and $l$ is the "character size" (i.e., the number of alphabetical elements in each character).

The codes utilized in the present invention may be derived from convolution codes as will now be described. The discussion will be limited to codes in which $m=1$.

Given a $B_0$ matrix of a binary convolution self-orthogonal $t$-bit error-correcting code of rate $(b-1)/b$, the $B_0$ matrix of a character error-correcting convolution self-orthogonal code of rate $k(b-1)/[k(b-1)+1]=(b'-1)/b'$ is constructed as follows:

1. Replace the $i^{th}$ nonzero element in the $j^{th}$ column of the $B_0$ matrix by a row vector $(1, \alpha^{i(1)}, \ldots, \alpha^{i(k-1)})$, where $\alpha$ is a primitive element of $GF(p^1)$.
2. Replace all zero entries of the matrix by zero row vectors of dimension $k$. (The parameter $k$ is arbitrarily chosen to obtain a code of rate $k(b-1)/[k(b-1)+1]$.)
3. Leave the last column (the parity check column) of the $B_0$ matrix unchanged. The matrix so obtained defines a character error-correcting convolution self-orthogonal code capable of correcting $t$-character errors and having a constraint length of $N[k(b-1)+1]=Nb'$, where $N$ is equal to the number rows in the $B_0$ matrix of the code.

Decoding the character error-correcting code described above is accomplished by (in effect) performing matrix multiplication of received sequences (where the received sequences are treated as column vectors) by $A_N$ to obtain the syndromes of the sequences. The received sequences so multiplied each consists of $Nb'/m$ characters. After one received sequence has been so processed, the next sequence to be multiplied by the matrix $A_N$ consists of the prior sequence without the last $b'$ characters of the sequence and augmented by the $b'$ most recently received characters, etc. (See the aforecited Wyner and Ash article.) Systems for utilizing the above-described codes will now be discussed.

Figure 2:
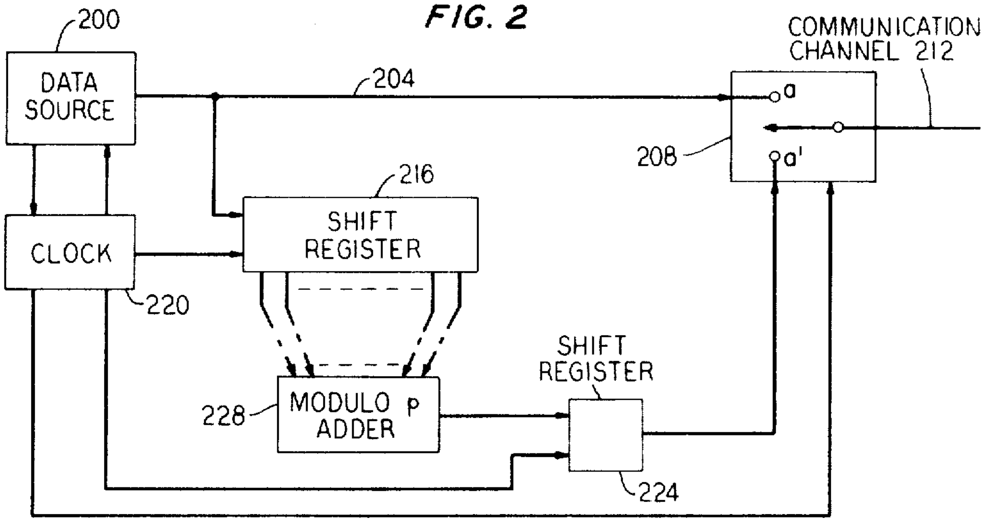
FIG. 2 shows a generalized transmitting terminal of an illustrative information processing system made in accordance with the principles of the present invention.

FIG. 2 shows a generalized illustrative encoder for a multiple-character correcting system made in accordance with the parity check matrix of FIG. 1, assuming that the matrix is the resultant of the construction procedure discussed above and that $m=1$, i.e., that the code rate is $(b-l)/b$. A data source 200 applies information characters to a line 204. While the characters are being applied to the line 204 a clock 220 causes a switch 208 to close on its $a$ contact so that the characters are applied by the line 204 to a communication channel 212. The information characters are likewise applied to an $N(b-1)-1$ character shift register 216. The clock 220 applies shift pulses to the shift register 216 thereby enabling the characters from the source 200 to be shifted into the register 216. As the $(b-1)^{th}$ character of any block of characters is shifted into the shift register 216, this character as well as certain other characters registered in the shift register are applied to a modulo $p$ adder 228 where the characters are added modulo $p$. (Some of the characters in the shift register 216 may first be modified by multiplication of the characters by certain constants before being applied to the modulo $p$ adder 228. This will be discussed in detail later.) The resultant (which is a parity character) obtained by the modulo $p$ adder 228 is applied to a shift register 224 and shifted thereinto in response to shift pulses applied by the clock 220 to the register 224. After the $(b-1)^{th}$ character of a block of characters has been applied to the line 204, the clock 220 temporarily inhibits the source 200 from applying more characters to the line. The clock then causes the switch 208 to close on its $a'$ contact and signals the shift register 224 to apply its contents, i.e., the parity character, to the communication channel 212. The clock 220 then causes the switch 208 to close on contact $a$ again, after which the clock signals the source 200 to again apply information characters to the line 204 and the process is repeated. In this manner, a parity character is generated for every $b-1$ information characters applied by the source 200 to the line 204.

Figure 3:
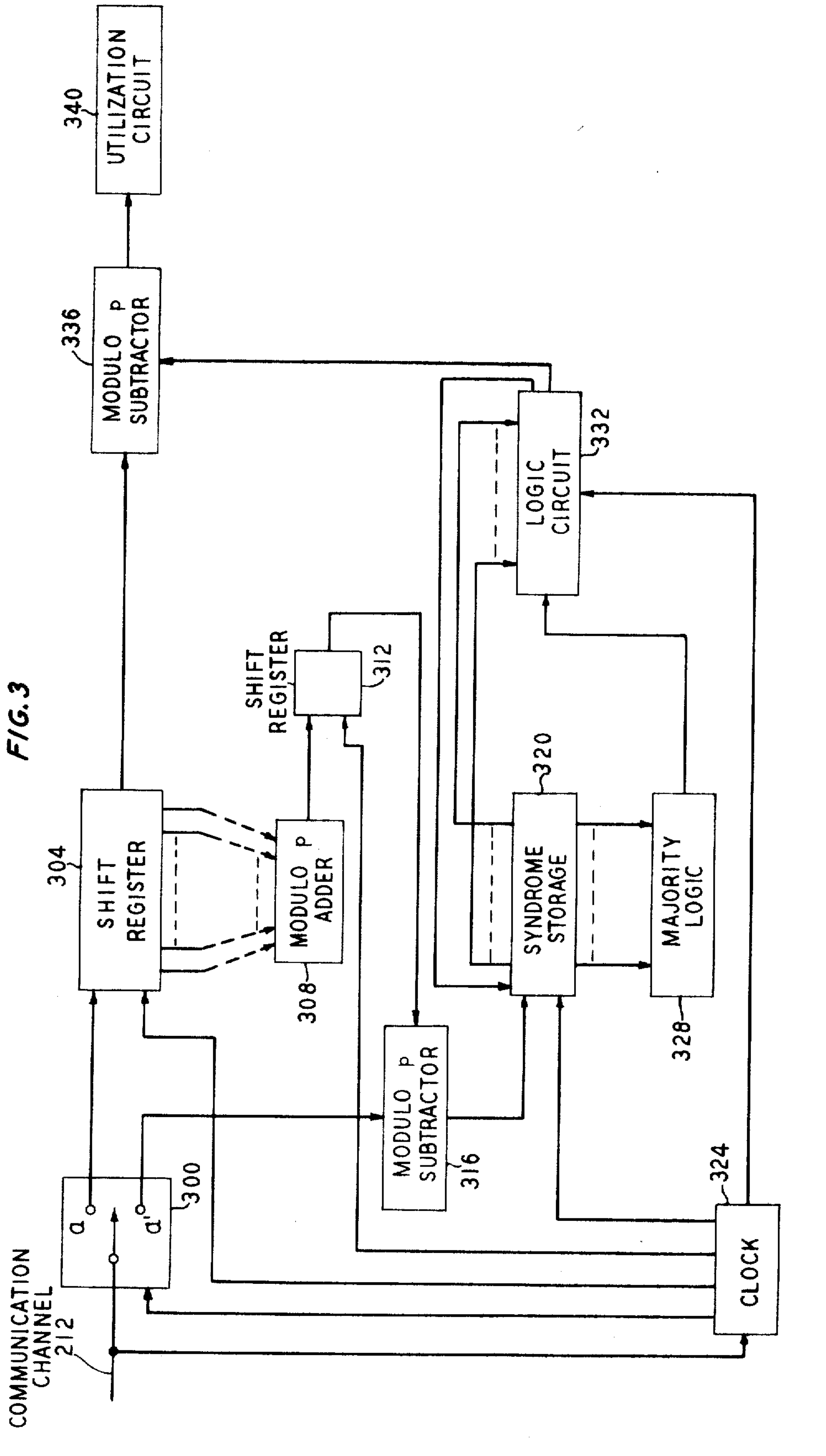
FIG. 3 shows a generalized receiving terminal of an illustrative information processing system made in accordance with the present invention.
Figure 4:
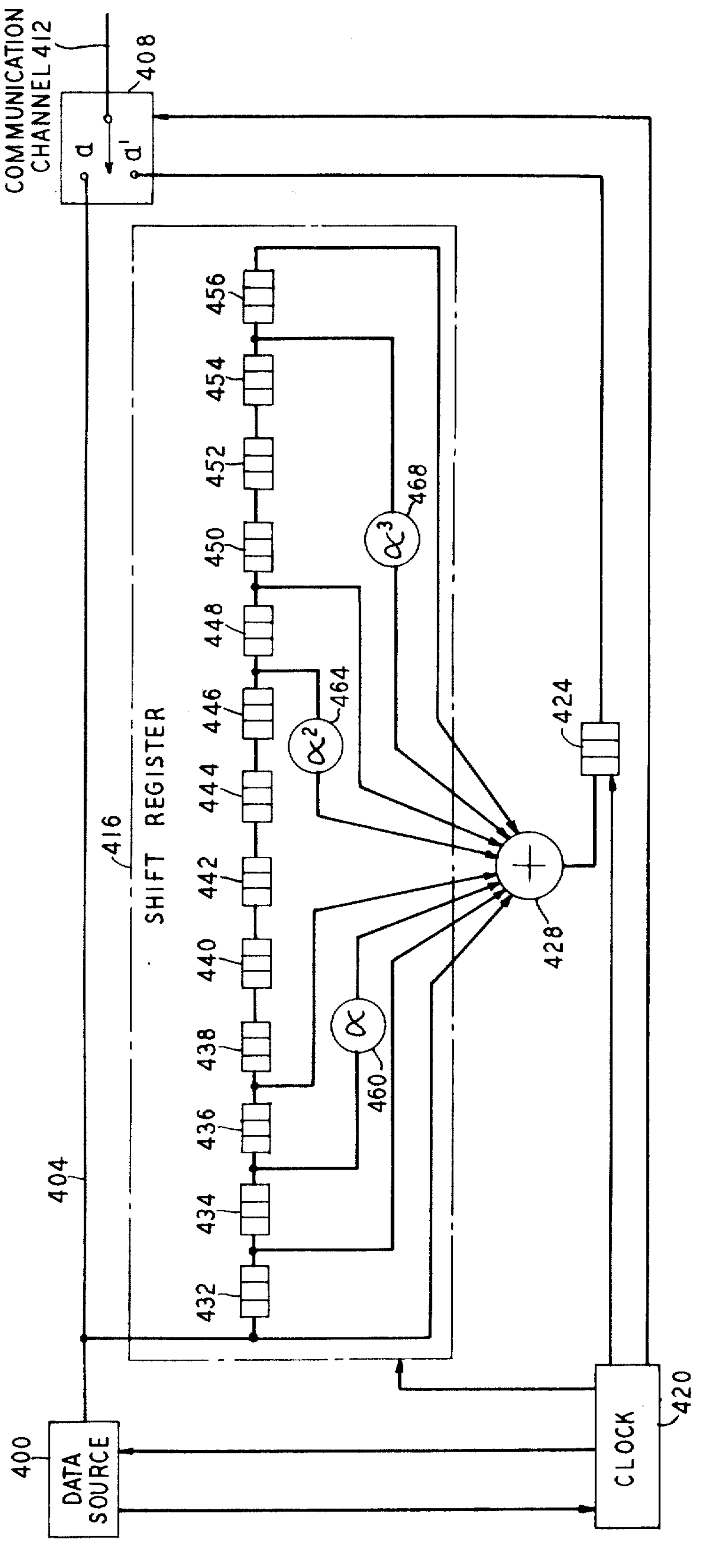
FIGS. 4, 5A, and 5B (with FIG. 5A positioned above FIG. 5B) show specific illustrative transmitting and receiving apparatus of a character error-correcting system made in accordance with the present invention.

FIG. 3 shows a generalized illustrative decoder which may be used in conjunction with encoder of FIG. 4. The first $b-1$ data characters of each block of characters received over the communication channel 212 are applied via a switch 300 to an $N(b-1)$ character shift register 304. Just as in the encoder of FIG. 2, the $(b-1)^{th}$ character of each block and certain of the characters registered in the register 304 are applied to a modulo $p$ adder 308 which computes a parity character therefrom. This character is registered in a single character shift register 312. After the receipt of the first $b-1$ characters of each block, a clock 324 causes switch 300 to close on contact $a'$ and the $b^{th}$ character of the block (a parity character) is received and applied to a modulo $p$ subtractor 316. Simultaneously therewith, the parity character stored in register 312 is applied to the modulo $p$ subtractor 316 and is subtracted modulo $p$ from the $b^{th}$ character. The resultant of such subtraction is then applied to a syndrome storage unit 320. This resultant constitutes one component of the $N$ component syndrome now stored in the syndrome storage unit 320. Of these $N$ components, $2t$ of them, designated $S_0, S_1, \ldots, S_{2t-1}$, will be used to correct errors in the block of characters to next emerge from the shift register 304. This block, referred to as the first block, was received and stored by the shift register 304 prior to any of the other $N-1$ blocks now stored in the register. The $2t$ components of the syndrome used in the error correction are designated by the nonzero entries of the first column of the $A_N$ matrix of the code. Specifically, if the $a^{th}$, $b^{th}$, $c^{th}$, etc. entries of the first column of matrix $A_N$ are the nonzero entries, then the $a^{th}$, $b^{th}$, $c^{th}$, etc. components of the syndrome are used in the error correction. This will be illustrated later.

After receipt of each new syndrome component, the syndrome storage unit 320 applies the $2t$ syndrome components referred to above, to a majority logic circuit 328 and to a logic circuit 332. If the number of nonzero elements of the applied components exceeds $t$, the majority logic circuit 328 signals a logic circuit 332 to solve the simultaneous equations $S_i=\alpha^{r_1 i}e_1+\ldots+\alpha^{r_{t'} i}e_{t'}$ for $r_1, \ldots, r_{t'}$ and $e_1, \ldots, e_{t'}$, where $t'$ is the number of errors in the first block ranging from 1 $t$, $i=0, \ldots, 2t'-1$, and $\alpha$ is the primitive root of $GF(p^1)$. Various values for $t'$ are substituted in the equations $S_i$ until one such value is found which satisfies $t+1$ or more of the equations. The values of $r$ obtained by the logic circuit 332 in solving the equations identify the positions of the erroneous characters in the first block. Each $e_i$ gives the value of the error in the corresponding error position $r_i$.

The values of $e$ obtained by the logic circuit 332 are applied to a modulo $p$ subtractor 336 where each $e_i$ is then subtracted from the character in position $r_i$ as the first block is shifted from the shift register 304 to the subtractor 336. In this manner the erroneous characters are corrected prior to being applied to a utilization circuit 340.

The logic circuit 332 also multiplies each $e_i$ by the factor $\alpha^{r_i(j)}$ and applies the resultant to the syndrome storage unit 320 where the resultant is subtracted from the corresponding syndrome component $S_j$. This removes the effect of errors on the syndrome.

The logic circuit 332 could be special purpose logic as will be discussed in an illustrative embodiment hereafter or it could be a general purpose computer such as a PDP–8 (made by Digital Equipment Corporation) programmed to solve the type of simultaneous equations discussed above.

Figure 6:
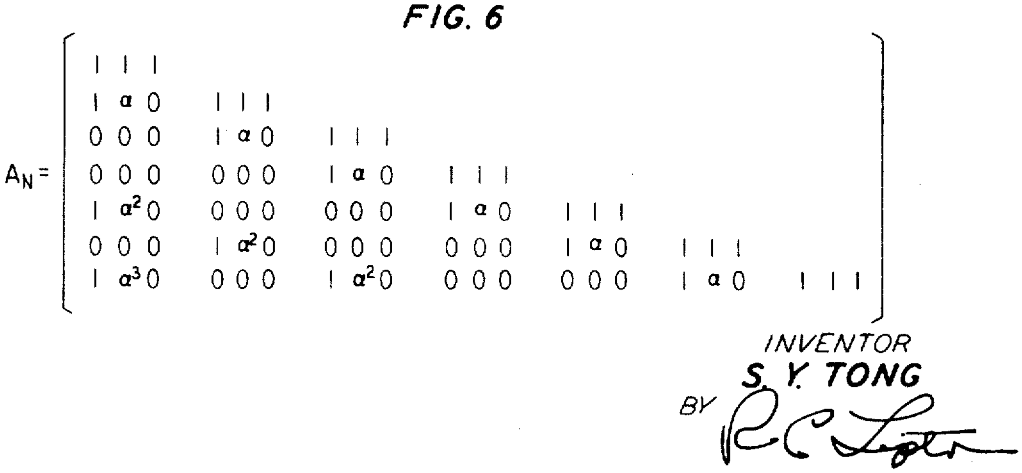
FIG. 6 shows the code defining matrix for the system of FIGS. 4, 5A, and 5B.
Figure 5A:
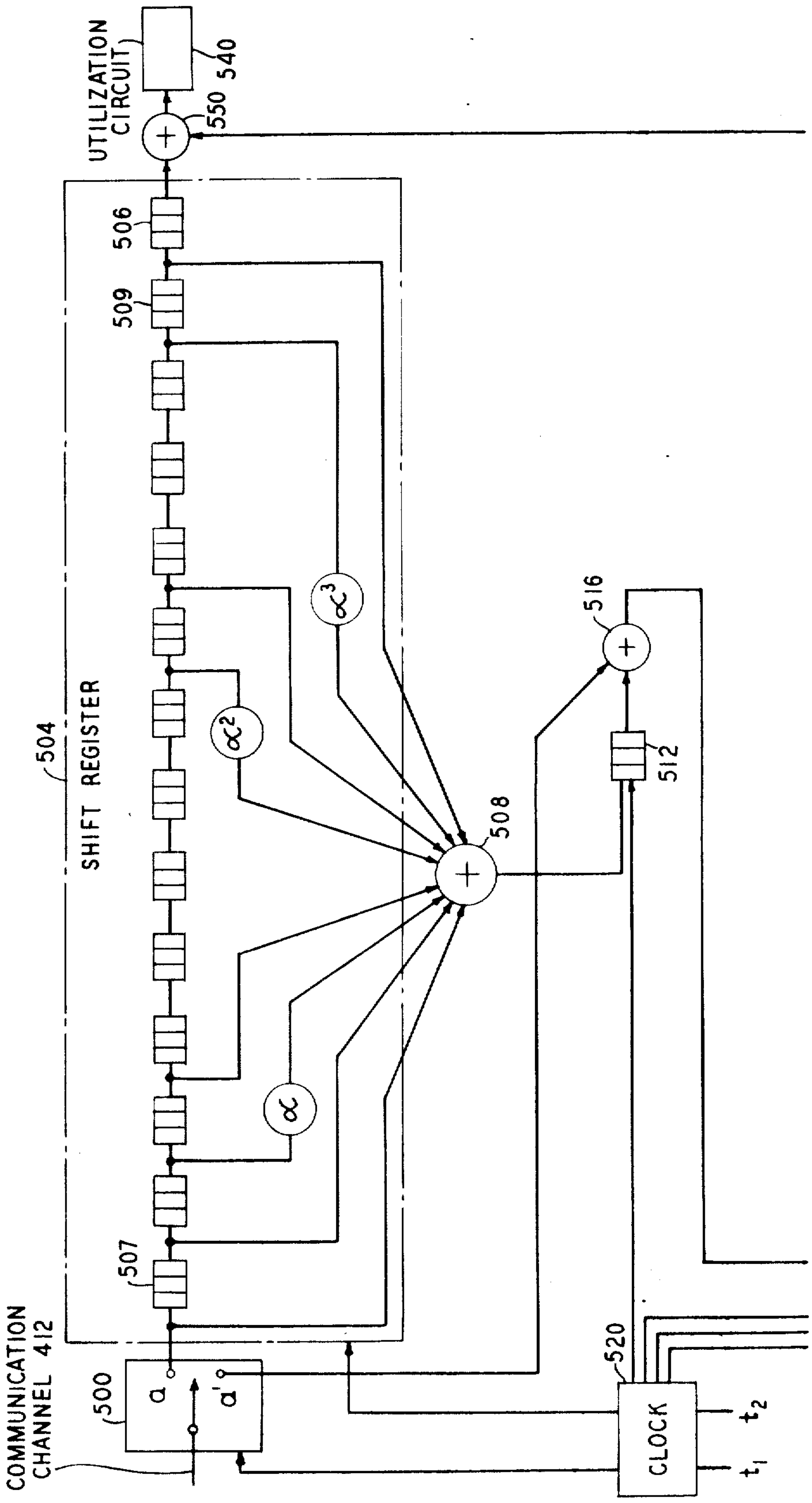
Figure 5B:
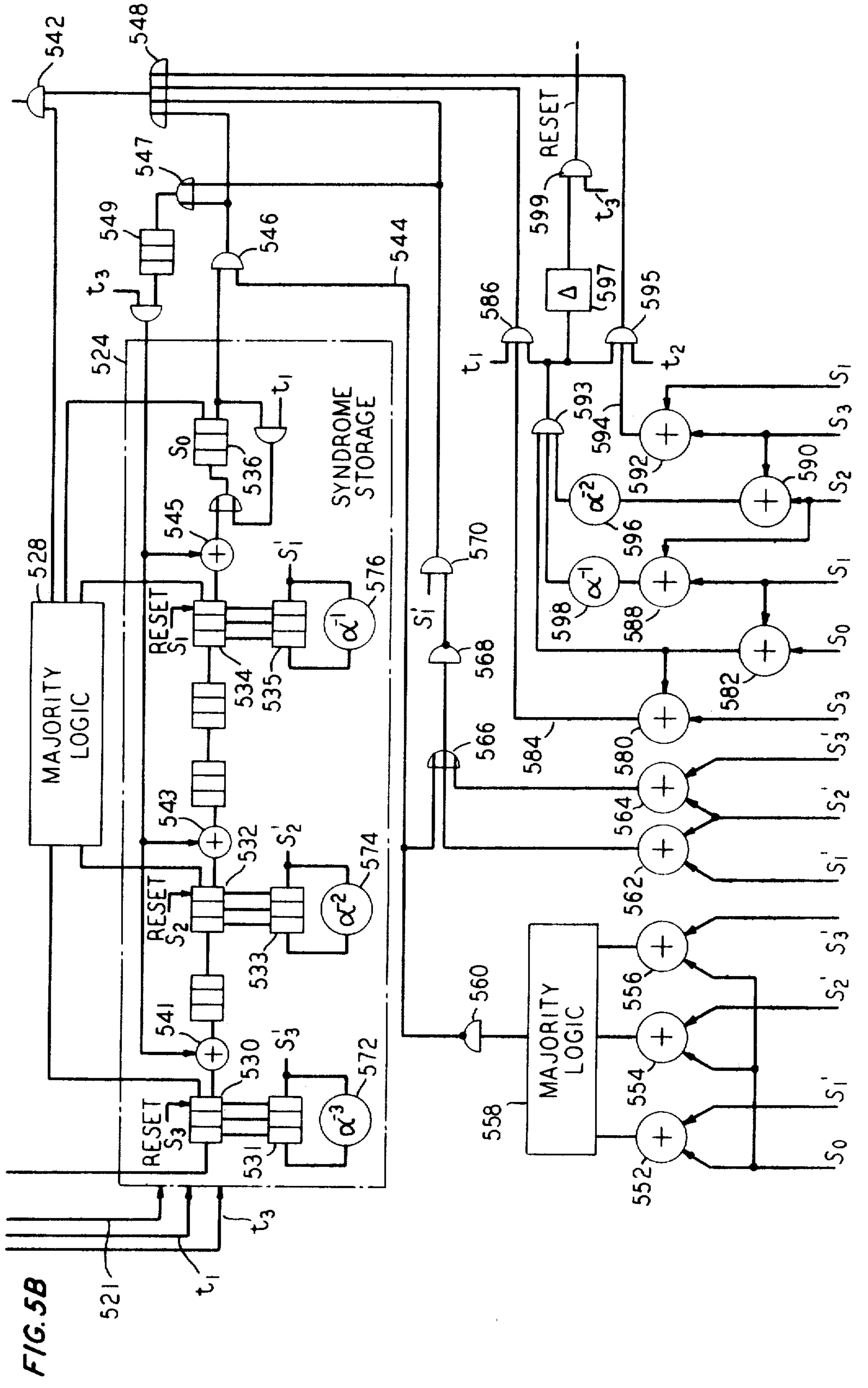

A more specific illustrative embodiment of a character and burst error-correcting system utilizing the principles of the present invention is shown in FIGS. 4, 5A, and 5B. The system there shown utilizes a double character error-correcting self-orthogonal convolution code of rate 2/3. The character length is $l=3$ bits and the block length is $b=3$ characters. The matrix $A_N$ which defines the code is shown in FIG. 6. The parameter $\alpha$ appearing in the matrix is a primitive element of $GF(2^3)$, the field over which the code is defined.

Before discussing the operation of the encoder of FIG. 4, an explanation will be given of how to determine the interconnections of register 416 with the modulo–2 adder 428 of FIG. 4. Briefly, such interconnections are determined by the matrix $A_N$ of the code utilized. In this case, the matrix used is shown in FIG. 6. The interconnections are determined by the so-called information character positions, i.e., the first two positions of each of the seven columns of the bottom row of the matrix. Each of these positions corresponds to a different one of the character registers (and the data source) of the encoder and indicates how the corresponding character register (or data source) is to be connected to the modulo–2 adder 428.

Referring now to the bottom row, the entry of a one in the second position of the seventh column indicates that the data source is to be connected directly to the modulo–2 adder 428; the entry of a one in the first position of the seventh column indicates that the output of the first 3-bit register 432 is also connected to the modulo-2 adder 428; the entry of $\alpha$ in the second position of the sixth column indicates that the output of the second 3-bit register 434 is to be multiplied by the value $\alpha$ before being applied to the modulo-2 adder 428 (this multiplication is performed by the multiplier 460 of FIG. 4); the entry of a one in the first position of the sixth column indicates that the output of the third register 436 is connected to the modulo-2 adder 428; and the entry of zeros in the first two positions of both the fourth and fifth columns indicate that the output of the next four registers 438, 440, 442, and 444 are not connected to the modulo-2 adder 428, etc. The operation of the encoder of FIG. 4 will now be described.

3-bit information characters are applied by a data source 400 to a line 404. While the information characters are being applied, a switch 408 is closed on contact *a* thereby transferring the information characters to a communication channel 412. The information characters are also applied to a shift register 416 and shifted thereto in response to clock pulses from a clock 420. The second information character of each pair of characters is also applied to a modulo-2 adder 428 along with the output of registers 432, 436, 448, and 456 and the output of register 434 as modified by the multiplication of $\alpha$, the output of register 446 as modified by the multiplication of $\alpha^2$, and the output of register 454 as modified by the multiplication of $\alpha^3$. Units 460, 464, and 468 are simply multipliers for multiplying the input thereto by the constant value shown on the unit i.e., $\alpha$ $\alpha^2$, or $\alpha^3$. The inputs to the modulo-2 adder 428 are then added modulo-2 and applied to a register 424 and shifted thereinto in response to shift pulses from the clock 420. The resultant generated by the modulo-2 adder 428 is simply a parity character.

After each pair of information characters is applied by the data source 400 to the line 404, the clock 420 temporarily inhibits the source 400 from applying any more characters to the line. The clock 420 then signals the register 424 to apply its contents to the communication channel 412 via the switch 408 which at this time is closed on contact *a'*. After the contents of the register 424 have been applied to the channel 412, the clock removes the inhibit signal from the data source 400 so that the data source may again apply information characters to the line 404. The data source 400 then applies another pair of information characters to the line 404 and the process described above is repeated. In this manner, a parity character is generated for each pair of information characters applied to the communication channel 412. (This group of three characters consisting of two information characters followed by a parity character, as indicated earlier, is referred to as a block.)

It should be understood that there are various alternative arrangements for the encoder of FIG. 4. For example two shift registers each containing six 3-bit shift registers could be substituted for the shift register 416. In this case, a modulo-2 adder and a 3-bit shift register would be associated with each of the registers. There are undoubtedly other arrangements which are equivalent to that shown in FIG. 4.

FIGS. 5A and 5B show a specific illustrative embodiment of a decoder for decoding the sequences encoded by the decoder of FIG. 4. Referring to FIG. 5A, the encoded sequences or characters are received over the communication channel 412 and applied by a switch 500 either to a shift register 504 (when the switch is closed on contact *a*) or to a modulo-2 adder 516 (when the switch is closed on contact *a'*). The pair of information characters of each block are applied to the shift register 504 while the parity character of each block is applied to the modulo-2 adder 516. The second information character of each pair along with certain of the contents of the shift register 504 as indicated in FIG. 5A are applied to a modulo-2 adder 508 which computes the modulo-2 sum thereof and applies it to a register 512. It is noted that the interconnections between the shift register 504 and the modulo-2 adder 508 are the same as those between shift register 416 and the modulo-2 adder 428 of FIG. 4 (except that the shift register 504 has one more character register than register 416.) Of course, as with the encoder, certain of the characters of the shift register 504 are multiplied by the value $\alpha$ or multiples thereof before being applied to the modulo-2 adder 508. The sum generated by the adder 508 is a parity character for the information characters stored in the shift register 504. For identification purposes, the characters stored in register 504 will be designated in accordance with the order in which they were received and stored. Thus, the first received character stored in the register 504 (stored in character register 506) is designated $C_1$ while the last received character (stored in character register 507) is designated $C_{14}$, etc.

After receipt of each pair of information characters and the generation of the parity character from the information characters stored in the shift register 504, a clock 520 causes the switch 500 to close on contact *a'* thereby enabling the transfer of the next received character (a parity character) from the communication channel 412 to the modulo-2 adder 516. Simultaneously therewith, the parity character stored in register 512 is applied to the adder 516 and added to the just received parity character. (It is to be noted that in the illustrative encoding and decoding system of FIGS. 2 and 3, the unit corresponding to the modulo-2 adder 516 was a modulo *p* subtractor. In the illustrative system of FIGS. 4, 5A, and 5B, and adder is employed since the system utilizes a binary coded self-orthogonal code and in a binary arithmetic, addition is the same as subtraction.)

The modulo-2 sum generated by the adder 516 is applied to a syndrome storage unit 524 shown in FIG. 5B. This sum, which is now stored in a character register 530 (labeled $S_3$), is one component of a syndrome now stored in the syndrome storage unit 524. This sum is also one of the syndrome components—designated $S_3$—which will be used in checking for errors in characters $C_1$ and $C_2$ stored in character registers 506 and 509, respectively. The other components which will be so used are $S_2$ stored in character register 532, $S_1$ stored in character register 534, and $S_0$ stored in register 536.

The components of the syndrome used in error checking, as indicated earlier, are determined by the $A_N$ matrix of FIG. 6. The designated components correspond to those entries of the first column of the matrix which contain nonzero entries. That is, the first, second, fifth and seventh components of the syndrome, stored in registers 536, 534, 532, and 530, respectively, are the designated components and they correspond to the first, second, fifth and seventh entries of the first column of the matrix, all of which are nonzero entries.

After each new syndrome component is applied to the syndrome storage unit 524, the contents of character registers 530, 532, and 534 are applied respectively to registers 531, 533, and 535 in response to a clock pulse via lead 521 from the clock 520. The contents of registers 530, 532, 534, and 536 are also applied to a majority logic circuit 528 (while at the same time being retained in the respective registers). If more than three of the components $S_0$, $S_1$, $S_2$, and $S_3$ contain nonzero entries, then the majority logic circuit 528 applies a signal to AND gate 542. This indicates that at least one of the characters $C_1$ or $C_2$ is in error. Assume first that only one of these characters is in error. If character $C_1$ is in error, then from an examination of the $A_N$ matrix of FIG. 6 and specifically of the leftmost column of the matrix which corresponds to the rightmost character position of the shift register 504, it is apparent that at least three of the four components $S_0$, $S_1$, $S_2$, and $S_3$ will have the same value. (If this character were the only character in error within the constraint length of the code, then all four syndrome components would have the same nonzero value. There may, however, be one other character error within the constraint length and still be within the error correcting capability of the code, but this error can affect at most only one of the four syndrome components in question. Thus at least three of the four components will have the same value if the character $C_1$ is in error.)

If $S_0$ is one of the three components having like value (in which case it equals $C_1$), then lead 544 will be made "high". This "high" signal in conjunction with the component $S_0$ which is shifted from register 536 in response to a clock pulse $t_1$ enables AND gate 546 and passes $S_0$ therethrough to OR gate 548 and to OR gate 547. The component $S_0$ is transferred through OR gate 547 and registered in a register 549. $S_0$ is also transferred through OR gate 548 and through AND gate 542 to a modulo–2 adder 550. AND gate 542 is, of course, enabled by the conjunctive receipt of $S_0$ and a signal from the majority logic circuit 528. Simultaneously with the application of $S_0$ to the adder 550, character $C_1$ is transferred from character register 506 to the modulo–2 adder 550. $S_0$ is then added to the character thereby correcting it. Thereafter, at a time $t_3$ when the contents of the syndrome storage unit 524 are shifted 3-bit positions to the right in response to a clock pulse $t_3$ from clock 520, $S_0$ is applied from register 549 to modulo–2 adders 545, 543, and 541. These adders add $S_0$ to the syndrome components being shifted from registers 530, 532, and 534 thereby correcting the components.

That lead 544 is made "high" if $S_0$ is one of the three syndrome components having like value is apparent from an examination of FIG. 5B. First of all, note that the inputs to the modulo–2 adders 552, 554, and 556 are the outputs of registers 536, 535, 533, and 531. At this time, these inputs are merely the syndrome components $S_0$, $S_1$, $S_2$, and $S_3$, respectively. If $S_0$ is one of the three like syndrome components, then clearly at least two of the three modulo–2 adders 552, 554, and 556 will have outputs of zero. If this is so, a majority logic circuit 558 applies a "low" signal to an inverter 560 which inverts the "low" signal to a "high" signal as indicated earlier.

If $S_0$ is not one of the three syndrome components having like value, then the remaining syndrome components $S_1$, $S_2$, and $S_3$ must all have the same value under the assumed conditions (i.e., that character $C_1$ is in error), which value is equal to $C_1$. If this is the case, then modulo–2 adders 562 and 564 will have outputs of zero which, when applied via OR gate 566 to an inverter 568, will be inverted to a "high" signal and applied to AND gate 570. The other input to AND gate 570 is the output of character register 535 which at this time is simply the syndrome component $S_1$. Enabling AND gate 570 causes the syndrome component $S_1$ to be applied via OR gate 547 to register 549 and via OR gate 548 and AND gate 542 to the modulo–2 adder 550. The adder 550 adds $S_1$ to the character $C_1$ thereby correcting the character. The effects of the error on the syndrome components $S_1$, $S_2$, and $S_3$ are also removed by adding $S_1$ thereto o($S_1$ is stored in register 549).

Now assume that character $C_2$ (registered in character register 509), but not character $C_1$ is in error. In this case again at least three of the components $S_0$, $S_1$, $S_2$, and $S_3$ will be nonzero but they will not be equal as in the above case. Rather, at least two of the three syndrome components $S_1$, $S_2$, and $S_3$ will be different from $S_0$ by multiples of $\alpha$. If $S_1$ is one of the two such components, it will be a multiple of $\alpha$ different from $S_0$. If $S_2$ is one of the two components, it will be a multiple of $\alpha^2$ different from $S_0$. And if $S_3$ is one of the two components, it will be a multiple of $\alpha^3$ different from $S_0$. So that the same circuitry which tested for the equality of the syndrome components in the above case can be utilized in this case, after the testing in the above case is completed, the syndrome component $S_3$ is divided by $\alpha^3$ by a divider 572 and the resultant stored in register 531. Likewise, $S_2$ is divided by $\alpha^2$ by a divider 574 and $S_1$ is divided by $\alpha$ by a divider 576. (Such division is carried out in response to clock pulses from clock 520.) The resultants of the division along with the component $S_0$ are applied to the modulo–2 adders 552, 554, 556, 562, and 564 and processed just as in the first case considered. That is, at least three of the four quantities applied to these modulo–2 adders will now have the same value. The determination of which quantities have the same value and therefore which syndrome component is to be added to the erroneous character is made the same as in the case where $C_1$ was assumed to be in error. Correction of the syndrome components is likewise done in the same fashion. In the above described manner, a single character error in the first block of characters in the shift register 504 can be corrected.

Now assume that both characters in registers 506 and 509 are in error. Since the error positions $r_1$ and $r_2$ are "zero" and "one" respectively, the value of the errors $e_1$ and $e_2$ can be obtained from the general formulas $S_i = \alpha^{r_1 i} e_1 + \ldots + \alpha^{r_{t'} i} e_{t'}$ (where $t'=2$) as follows. First note that $$\begin{aligned} S_0 &= e_1 + e_2 \\ S_1 &= e_1 + \alpha e_2 \\ S_2 &= e_1 + \alpha^2 e_2 \\ S_3 &= e_1 + \alpha^3 e_2. \end{aligned} \tag{1}$$

Adding $S_0$, $S_1$, and $S_3$ gives $$S_0 + S_1 + S_3 = e_1 + e_2(1 + \alpha + \alpha^3). \tag{2}$$

Since the primitive polynomial of the code utilized by the system of FIGS. 4, 5A, and 5B is $g(x)=x^3+x+1$, it is clear that $\alpha^3+\alpha+1=0$. (A primitive polynomial is a polynomial one of whose roots generates the symbols of $GF(2^3)$.) Thus, equation (2) becomes $$S_0 + S_1 + S_3 = e_1. \tag{3}$$

Thus, the error pattern $e_1$ can be obtained by the decoder of FIGS. 5A and 5B simply by generating the modulo–2 sum of $S_0$, $S_1$, and $S_3$. This precisely is the function of modulo–2 adders 580 and 582. The output on line 584 when $C_1$ and $C_2$ are in error is thus $e_1$. Further, when these two characters are both in error, then $S_0+S_1=\alpha^{11}(S_1+S_2)=\alpha^{12}(S_2+S_3)$. Detection of these conditions is accomplished by the modulo–2 adders 582, 588, and 590, divider units 598 and 596 and an AND gate 593. That is, when these conditions obtain, AND gate 593 is enabled to thereby apply a "high" signal to AND gates 586 and 595. A "high" signal from AND gate 593 coupled with a clock pulse $t_1$ from the clock 520 enables the transfer of $e_1$ from line 584 through AND gate 586 and OR gate 548 to AND gate 542. Since AND gate 542 is enabled by a signal from the majority logic circuit 528, $e_1$ is transferred through AND gate 542 to the modulo–2 adder 550. The modulo–2 adder 550 then adds the value of $e_1$ to character $C_1$ emerging from character register 506 thereby correcting the character.

The error value $e_2$ utilized in correcting the character $C_2$ is generated as follows. From equations (1), note that $e_2=S_0+e_1$. Since $e_1=S_0+S_1+S_3$ (equation 3), then $e_2=S_0+(S_0+S_1+S_3)=S_1+S_3$. The modulo–2 sum of $S_1+S_3$ is generated by the modulo–2 adder 592 of FIG. 5B and applied to line 594. The "high" signal from AND gate 593 along with the clock pulse $t_2$ (which occurs after clock pulse $t_1$) enables the passage of $e_2$ through AND gate 595 to OR gate 548. From OR gate 548, $e_2$ is applied via AND gate 542 to the modulo– 2 adder 550. The modulo–2 adder 550 adds $e_2$ to character $C_2$ as it emerges from character register 506 having passed therethrough from character register 509. In this manner, character $C_2$ is corrected. The corrected versions of the two erroneous characters are applied to a utilization circuit 540.

In the case of $C_1$ and $C_2$ both being in error, the syndrome components $S_1$, $S_2$, and $S_3$ are corrected merely by setting the components to a zero value. This is accomplished by applying a "high" signal from AND gate 593 via a delay unit 597 and AND gate 599 to registers 530, 532, and 534 at a time $t_3$ just as the contents of these registers are being shifted to the right. The contents of the registers are set to zero in response to the "high" signal.

The operation of the FIGS. 5A and 5B circuit will now be briefly summarized. If only character $C_1$ is in error, then line 544 is made "high" if $e_1=S_0$ whereas line 569 is made "high" if $e_1=S_1$. In either case, character $C_1$ in register 506 is corrected. If character $C_2$ is in error, then neither line 544 nor 569 will be made "high" until after $S_1$, $S_2$, and $S_3$ have been divided respectively by $\alpha$, $\alpha^2$, and $\alpha^3$. After such division, if $e_2=S_0$, then line 544 will be made "high" whereas if $e_2=S_1$ then line 569 will be made "high". In either case, character $C_2$ in register 509 will be corrected by adding $e_2$ to the character. If both $C_1$ and $C_2$ are in error, then neither line 544 nor line 569 is made "high", but rather, AND gate 593 is enabled. The value $e_1$ is generated by the modulo–2 adders 580 and 582 and applied to AND gate 586 during a first period of time $t_1$. The value $e_1$ is then applied via OR gate 548 and AND gate 542 to the modulo–2 adder 550 to thereby correct character $C_1$ in register 506.

The error value $e_2$ is generated by the modulo–2 adder 592 and applied to AND gate 595 during a second time interval $t_2$. From there, $e_2$ is applied via OR gate 548 and AND gate 542 to the modulo–2 adder 550 to correct character $C_2$.

What I claim is:

1. A data error-correcting system comprising:

means for generating the syndrome of blocks of data characters which have been encoded into code words of a $t$ character error-correcting self-orthogonal convolution code, said data characters comprising elements of a finite field $GF(p^1)$, threshold logic means connected to said generating means for generating a signal when the number of nonzero elements in a portion $\{S_0, S_1, \ldots, S_{2t-1}\}$ of said syndrome exceeds a threshold value $t$, computing means connected to said generating means and responsive to a signal from said threshold logic means for computing solutions $e_1, \ldots, e_{t'}$, of simultaneous equations $S_i = \alpha^{r_1 i} e_1 + \ldots + \alpha^{r_{t'} i} e_{t'}$ , where $t'$ is the number of errors in a block ranging from 1 to $t$ and is determined as that value which satisfies $t+1$ or more of the equations $S_i$, $i=0, \ldots, 2t-1$, and $\alpha$ is the primitive root of $GF(p^1)$, and means for subtracting modulo $p$ each $e_i$ obtained by said computing means from the character in position $r_i$ of said block of characters.

2. A system as in claim 1 further including means for multiplying each $e_i$ by $\alpha^{r_i j}$ and means for subtracting each product thereof from the corresponding syndrome component $S_j$, where $j=0, \ldots, 2t-1$.

3. In a data processing system in which data characters have been encoded into a $t$ character error-correcting self-orthogonal convolution code of rate $(b-1)/b$ and constraint length $Nb$, said characters comprising elements of a finite field $GF(p^1)$, a first shift register for storing $N(b-1)$ of said encoded data characters, where the $i^{th}$ encoded one of said stored characters is designated $r_i$, a modulo $p$ adder connected to said first shift register for generating the modulo $p$ sum of certain of the characters stored in said shift register or multiples thereof, a second shift register connected to said modulo $p$ adder for storing the sums generated by said adder, a modulo $p$ subtractor for subtracting each of said sums from a different one of the parity characters of said encoded data characters to thereby generate syndrome components of the data characters stored in said first shift register, a syndrome storage unit connected to said subtractor for storing said syndrome components, a majority logic unit connected to said syndrome storage unit for generating a signal when the number of nonzero components in a portion $\{S_0, S_1, \ldots, S_{2t-1}\}$ of said syndrome exceeds $t$, and logic means for generating the values $e_1, \ldots, e_{t'}$ of the equations $S_i = \alpha^{r_1 i} e_1 + \ldots + \alpha^{r_{t'} i} e_{t'}$ , where $t'$ is the number of errors in a block of $b-1$ characters stored in said first shift register ranging from 1 to $t$ and is determined as that value which satisfies $t+1$ or more of the equations $S_i$, $i=0, \ldots, 2t-1$, and $\alpha$ is the primitive root of $GF(p^1)$.

4. The system of claim 3 further comprising means responsive to a signal from said majority logic means for subtracting (modulo $p$) each $e_i$ generated by said logic circuit from the character $r_i$ stored in said first shift register thereby correcting the characters.

5. The system of claim 4 further comprising means for multiplying each $e_i$ by $\alpha^{r_i j}$ and means for subtracting each product thereof from the corresponding syndrome component $S_j$, where $j=0, \ldots, 2t-1$.

6. In a data processing system comprising a source of data characters, an encoder for encoding said data characters in a double character error-correcting self-orthogonal convolution code of rate 2/3, the characters of which constitute elements of a finite field $GF(2^1)$, said encoder comprising a 13 character shift register for temporarily storing data characters from said source, a first modulo–2 adder interconnected with said shift register in accordance with the $A_N$ matrix of the code whose bottom row contains the entries $1\alpha^3 0$ $000$ $1\alpha^2 0$ $000$ $000$ $1\alpha 0$ $111$ for generating a parity character from the characters stored in said shift register, a first single character shift register for temporarily storing the parity character generated by said adder, and means for alternately applying two data characters from said source and a parity character generated by said adder to a communication channel.

7. The arrangement of claim 6 further including a 14 character shift register for storing and shifting therethrough 14 characters at a time represented as $C_1, \ldots C_{14}$, where $C_i$ represents the $i^{th}$ stored character of each group of 14 characters, a second modulo–2 adder, means connected to said communication channel for alternately applying two data characters from said channel to said 14 character shift register and a parity character from said channel to said second modulo–2 adder, a third modulo–2 adder connected to said 14 character shift register for generating a parity character from the characters stored in said 14 character shift register, a second single character shift register for temporarily storing the parity characters generated by said third modulo–2 adder, said second modulo–2 adder being further arranged to add each parity character received from said channel to a parity character stored in said second single character shift register to thereby generate syndrome components of the data characters stored in said 14 character shift register, and a syndrome storage unit connected to said second modulo–2 adder for storing said syndrome components, the first, second, fifth, and seventh of such components stored therein being designated $S_0$, $S_1$, $S_2$, and $S_3$, respectively.

8. The arrangement of claim 7 further including means connected to said syndrome storage unit for generating a first signal when three or more of the components of the group $S_0$, $S_1$, $S_2$, and $S_3$ are equal, means responsive to said first signal for adding one of said equal components to the character $C_1$ as it is shifted from said 14 character shift register, means for dividing $S_1$, $S_2$, and $S_3$ by $\alpha$, $\alpha^2$, and $\alpha^3$, respectively, to obtain $S_1'$, $S_2'$, and $S_3'$, respectively, means connected to said dividing means and said syndrome storage unit for generating a second signal when three or more of the components $S_0$, $S_1'$, $S_2'$, and $S_3'$ are equal, means responsive to said second signal for adding one of said equal components of the components $S_0$, $S_1'$, $S_2'$, and $S_3'$ to the character $C_2$ as it is shifted from said 14 character shift register, means connected to said syndrome storage unit for generating a third signal when $S_0+S_1=\alpha^{11}(S_1+S_2)=\alpha^{12}(S_2+S_3)$, means for adding $S_0$, $S_1$, and $S_3$ to obtain a first sum, means for adding $S_1$ and $S_2$ to obtain a second sum, and means responsive to said third signal for adding said first sum to the character $C_1$ as it is shifted from said 14 character shift register and for adding said second sum to the character $C_2$ as it is shifted from said 14 character shift register.

9. The arrangement of claim 8 further including means responsive to said first signal for adding one of the equal components of the group $S_0$, $S_1$, $S_2$, and $S_3$ to $S_1$, $S_2$, and $S_3$ when three or more of the components of the group $S_0$, $S_1$, $S_2$, and $S_3$ are equal, means responsive to said second signal for adding one of the equal components of the group $S_0$, $S_1'$, $S_2'$, and $S_3'$ to $S_1$, $S_2$, and $S_3$ when three or more of the components of the group $S_0$, $S_1'$, $S_2'$, and $S_3'$ are equal, and means responsive to said third signal for setting the components $S_1$, $S_2$, and $S_3$ to zero.

UNITED STATES PATENT OFFICE
CERTIFICATE OF CORRECTION

Patent No. 3,593,282 Dated July 13, 1971

Inventor(s) Shih Y. Tong

It is certified that error appears in the above-identified patent and that said Letters Patent are hereby corrected as shown below:

| Abstract | Line | |
|---|---|---|
| | 12 | Change "$\alpha^{rli}$" to --$\alpha^{r_1 i}$--; |
| | 14 | Change "t) to --t'--. |

| Column | Line | |
|---|---|---|
| 1 | 57 | Change "GF($p^1$)" to --GF($p^\ell$)--; |
| | 68 | Change "GF($p^1$)" to --GF($p^\ell$)--. |
| 2 | 34 | Change "semiinfinite" to --semi-infinite--; |
| | 44 | Change "semiinfinite" to --semi-infinite--; |
| | 47 | Change "work" to --word--; |
| | 65 | Change "GF($p^1$)" to --GF($p^\ell$)--. |
| 3 | 2 | Change "(1,$\alpha^{ill}$,...,$\alpha^{k(ill)}$)," to --(1,$\alpha^{i-1}$,...,$\alpha^{k(i-1)}$),--; |
| | 3 | Change "GF($p^1$)" to --GF($p^\ell$)--. |
| 4 | 7 | Change "$S_1,\ldots,S_{2tll}$," to --$S_1,\ldots,S_{2t-1}$,--; |
| | 26 | Change "1 t" to --1 to t--; |
| | 27 | Change "GF($p^1$)" to --GF($p^\ell$)--; |
| | 41 | Change "$\alpha^{j(ill)}$" to --$\alpha^{j(i-1)}$--. |

UNITED STATES PATENT OFFICE
CERTIFICATE OF CORRECTION

Patent No. 3,593,282 Dated July 13, 1971

Inventor(s) Shih Y. Tong

It is certified that error appears in the above-identified patent and that said Letters Patent are hereby corrected as shown below:

| Column | Line | |
|---|---|---|
| 5 | 12 | Change "not" to --not--; |
| | 19 | Change "thereto in" to --thereinto in--. |
| 7 | 45 | Delete "0" after "thereto" and before "($S_1$"; |
| | 73 | Change "single" to --single--. |
| 8 | 1 | Change "both" to --both--; |
| | 23,24 | Change "$S_0+S_1=\alpha^{11}(S_1+S_2)=\alpha^{12}(S_2+S_3)$." to --$S_0+S_1=\alpha^{-1}(S_1+S_2)=\alpha^{-2}(S_2+S_3)$.--; |
| | 46 | Change "modulo- 2" to --modulo-2--; |
| 9 | 11 | Change "GF($p^1$)" to --GF($p^\ell$)--; |
| | 22 | Change "GF($p^1$)" to --GF($p^\ell$)--; |
| | 26 | Change "$\alpha^{j(ill)}$" to --$\alpha^{j(i-1)}$--; |
| | 34 | Change "GF($p^1$)" to --GF($p^\ell$)--; |
| | 59 | Change "GF($p^1$)" to --GF($p^\ell$)--; |
| | 66 | Change "$\alpha^{j(ill)}$" to --$\alpha^{j(i-1)}$--. |

RM PO-1050 (10-69)

USCOMM-DC 60376-P69
★ U.S. GOVERNMENT PRINTING OFFICE : 1969 O—366-334

UNITED STATES PATENT OFFICE

CERTIFICATE OF CORRECTION

Patent No. 3,593,282 Dated July 13, 1971

Inventor(s) Shih Y. Tong

It is certified that error appears in the above-identified patent and that said Letters Patent are hereby corrected as shown below:

| Column | Line | |
|---|---|---|
| 10 | 4 | Change "$GF(2^1)$" to --$GF(2^\ell)$--; |
| | 53,54 | Change "$S_0+S_1=\alpha^{11}(S_1+S_2)=\alpha^{12}(S_2+S_3)$," to --$S_0+S_1=\alpha^{-1}(S_1+S_2)=\alpha^{-2}(S_2+S_3)$,--. |

Signed and sealed this 9th day of November 1971.

(SEAL)
Attest:

EDWARD M.FLETCHER,JR.
Attesting Officer

ROBERT GOTTSCHALK
Acting Commissioner of Patents

RM PO-1050 (10-69)

USCOMM-DC 60376-P69
☆ U.S. GOVERNMENT PRINTING OFFICE : 1969 O—366-334